United States Patent [19]

Sahlin

[11] Patent Number: 4,921,395
[45] Date of Patent: May 1, 1990

[54] APPARATUS FOR LOADING AND/OR UNLOADING INDUSTRIAL PRESSES

[75] Inventor: Richard T. Sahlin, Bloomfield Hills, Mich.

[73] Assignee: Sahlin International, Inc., Birmingham, Mich.

[21] Appl. No.: 918,346

[22] Filed: Oct. 14, 1986

Related U.S. Application Data

[63] Continuation of Ser. No. 368,914, Apr. 16, 1982.

[51] Int. Cl.⁵ .............................................. B25J 18/04
[52] U.S. Cl. .............................. 414/744.3; 414/744.5; 414/744.6; 901/15; 901/21; 901/28
[58] Field of Search .......... 414/744 R, 744 A, 744 B, 414/744 C, 749-753, 1-8, 589, 744.1, 744.2, 744.3, 744.5, 744.6; 901/15, 21, 28, 50; 308/230

[56] References Cited

U.S. PATENT DOCUMENTS

| | | | |
|---|---|---|---|
| 2,572,874 | 10/1951 | MacKnight | 297/241 |
| 3,010,587 | 11/1961 | Hollinger | 414/744 R |
| 4,056,198 | 1/1977 | Boserup | 414/733 |
| 4,226,568 | 10/1980 | Christain | 414/589 |
| 4,299,533 | 11/1981 | Ohnaka | 414/752 |
| 4,370,091 | 1/1983 | Gagliardi | 414/738 X |
| 4,392,776 | 7/1983 | Shum | 901/15 X |
| 4,507,046 | 3/1985 | Sugimoto et al. | 901/15 X |

FOREIGN PATENT DOCUMENTS

| | | | |
|---|---|---|---|
| 922331 | 3/1973 | Canada | 414/744 R |
| 2802738 | 7/1979 | Fed. Rep. of Germany . | |
| 2346071 | 10/1977 | France . | |
| 2440270 | 5/1980 | France . | |

Primary Examiner—David A. Bucci
Assistant Examiner—Donald W. Underwood

[57] ABSTRACT

Work-handling apparatus, such as may be used in automatically loading and unloading a press in the manufacture of metal pressings, is arranged to reciprocate a work-handling attachment substantially linearly. The attachment is pivotally mounted on a crank lever, which is pivotally mounted on a crank arm, which is pivotally mounted on mounting means, the pivot axes of the crank arm, which is pivotally mounted on mounting means, the pivot axes of the crank arm and the attachment being substantially equi-distant from that of the crank lever. By means of geared connections between the mounting means and the crank lever (in the ratio of substantially 2:1), and between the crank arm and the attachment (in the ratio of substantially 1:2) the attachment is caused to maintain a substantially constant orientation during linear movement resulting from the coordinated rotations of the crank lever and the crank arm.

21 Claims, 3 Drawing Sheets

APPARATUS FOR LOADING AND/OR UNLOADING INDUSTRIAL PRESSES

RELATED APPLICATION

This application is a continuation of Ser. No. 368,914, filed Apr. 16, 1982.

BACKGROUND

This invention is concerned with improvements in or relating to work pick-up and/or handling apparatus such as may be used in automatically picking up, moving, and releasing workpieces with respect to different positions or stations in a repetitive manufacturing process. For example, such apparatus may be used in loading and/or unloading a press in the manufacture of metal pressings or stampings. In particular, the invention relates to such apparatus which is arranged to impart to work-supporting means of the apparatus, and so to a workpiece when held, a reciprocable linear movement.

One such apparatus is described in U.K. patent specification No. 1,395,058. That known apparatus comprises a linearly-reciprocable wheeled carriage for supporting any one of a variety of work-handling attachments. The carriage is constrained by guide rails to remain in a constant orientation as it is reciprocated to and fro along a linear path. The carriage is pivotally connected to a crank level which in turn is pivotally connected to a crank arm, the three pivot axes being in parallel and the effective lengths of the crank arm and crank lever, measured between the pivot axes, being equal. By means of a geared connection in the ratio 2:1 from a stationary gear on the pivot axis of the crank arm to a gear which is fast with the crank lever and on the pivot axis of the crank lever, it is provided that linear motion is imparted to the carriage upon rotation of the crank arm about its pivot axis, the linear path of the carriage being intersected by the pivot axis of the crank arm.

BRIEF SUMMARY

It is an object of the present invention to provide work handling apparatus for industrial presses which comprises work-supporting means that is arranged to be linearly reciprocated without the need for guide rails in order to determine its path of movement and which, preferably, also maintains the orientation of the work-supporting means constant.

A preferred form of the invention provides in one of its aspects, work handling apparatus comprising mounting means, a first arm pivotally mounted on said mounting means for movement about a first pivot axis, a second arm pivotally mounted on said first arm for movement about a second pivot axis parallel to said first pivot axis, and work-supporting means pivotally mounted on said second arm for movement about a third pivot axis parallel to said first and second pivot axes, said first and third pivot axes preferably being substantially equi-distant from said second pivot axis and the apparatus comprising first coordinating means arranged to so coordinate movements of the arms about the first and second pivot axes that said work-supporting means moves substantially linearly, and with preferably a second coordinating means comprising a geared connection of a desired ratio between said first arm and said work-supporting means whereby a desired orientation of said work-supporting means is obtained, such as no angular change despite linear movement.

Preferably, the first arm is pivotally mounted on a linearly-reciprocable carriage of the mounting means, the carriage being reciprocable relative to a carrier of the mounting means in a direction perpendicular to the direction in which the work-supporting means is arranged to move. The work-supporting means is preferably arranged to move generally horizontally (upon movement of the two arms) and the carriage arranged to move generally vertically on the carrier. The carriage and the carrier may be telescopically arranged, and in a preferred construction the carriage is suspended from the carrier by means comprising a plurality of pneumatic balancer cylinders and guided in its movements by rollers mounted on one of the carriage and the carrier and arranged to roll against the other.

The work-supporting means may be arranged to carry any one of a variety of work-holding attachments for picking-up, moving and releasing workpieces, such as vacuum cups, jaws, gripping fingers, magnets, etc. An electrical and/or fluid control system (not shown) may be employed to synchronise operation of the apparatus and a work-holding attachment with operation of a press, for example, which the apparatus is to load and/or unload automatically. The mounting means of the work handling apparatus may be secured in any of various positions, such as directly on a press frame, on a powered transfer carriage across a press, or on a transfer system or conveyor. The absence of guide rails for the work-supporting means provides more floor clearance around the press and thereby encourages efficient operation at high speed.

There now follows a detailed description, to be read with reference to the accompanying drawings, of a presently preferred embodiment which illustrates the invention by way of example.

DETAILED DESCRIPTION OF THE INVENTION

Figure 1:
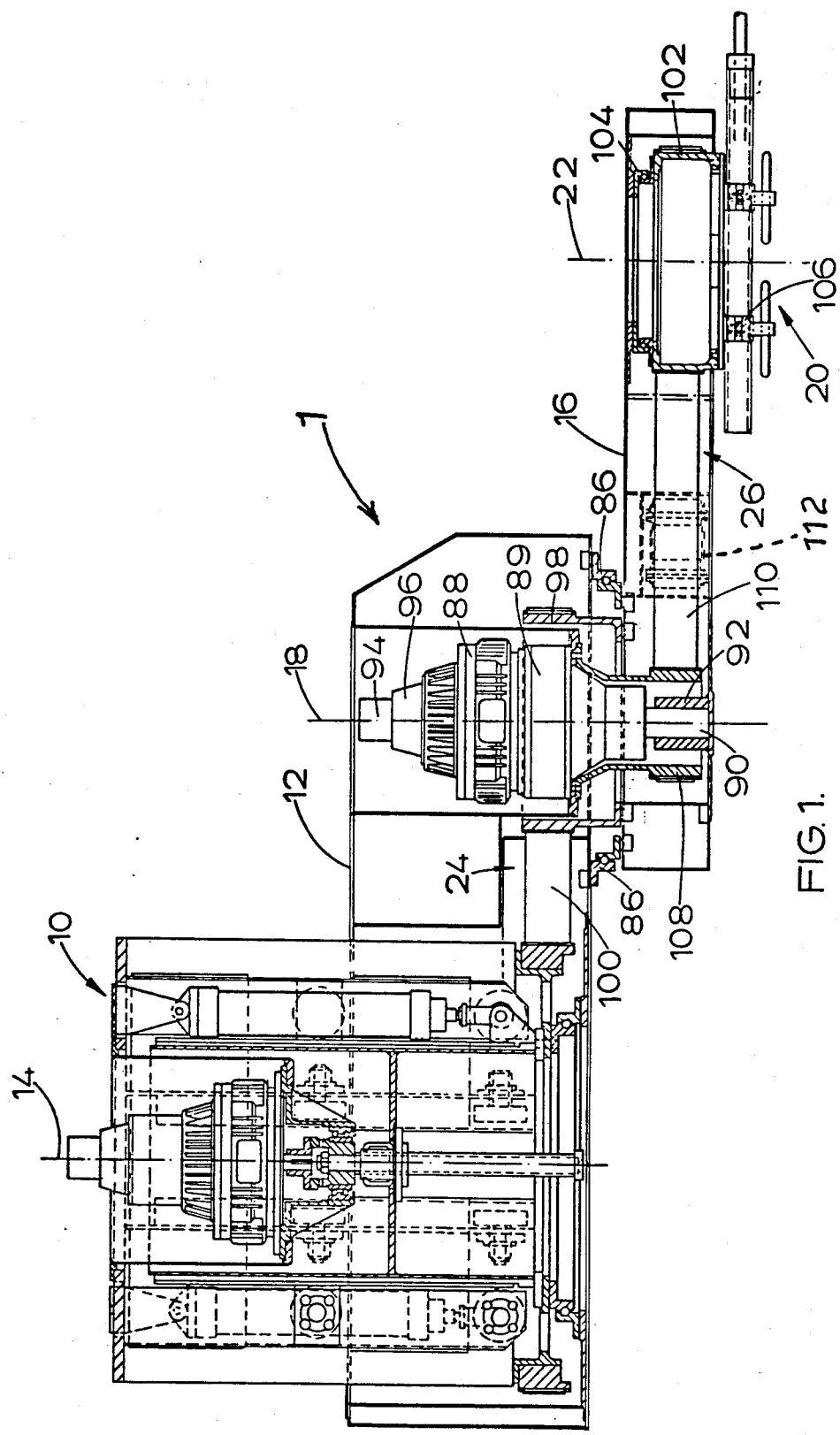
FIG. 1 is a sectional view of the apparatus, taken in section along a vertical midplane with the machine in extended position.

Apparatus illustrating a preferred form of the invention comprises mounting means 10 which could be secured, for example, to the frame of a large industrial press used to fabricate shapes in large steel workpieces, such as roofs of automobiles. A first arm 12 (hereinafter referred to as the crank or upper arm) is pivotally mounted on the mounting means for movement about a first vertical pivot axis 14. A second arm 16 (hereinafter referred to as the crank lever or lower arm) is pivotally mounted on the crank arm 12 for movement about a second vertical pivot axis 18. Work-supporting means 20 is pivotally mounted on the crank lever 16 for movement about a third vertical pivot axis 22. The first and third pivot axes 14 and 22 are equi-distant from the second pivot axis 18. The apparatus 1 comprises also first coordinating means, comprising a first geared connection 24, arranged to so-coordinate movements of the crank arm 12 and the crank lever 16 about the first and second pivot axes 14 and 18 that the work-supporting means 20 moves linearly along a horizontal path. The apparatus 1 also comprises second coordinating means, comprising a second geared connection 26, whereby the orientation of the work-supporting means 20 is maintained constant throughout swinging movements of the crank arm and crank lever.

The mounting means 10 (see FIGS. 2 and 3) comprises a linearly-reciprocable carriage 28 on which the crank arm 12 is pivotally mounted, the carriage being reciprocable vertically relative to a carrier 30 of the mounting means. The carriage and carrier are telescopically arranged, with the carriage 28 mounted within the carrier 30. The carriage comprises a straight, vertically aligned, tubular frame 32 of a generally octagonal cross-section, bearing an internal cross-plate 34. Secured to the bottom end of the tubular frame 32, and aligned coaxially with the frame, are a first pulley 36 and an inner race of a first slewing or turnable bearing 38 of the machine.

The carrier 30 also comprises a generally octagonal tubular frame 40, coaxially arranged around the carriage and depending from an annular, horizontal, top plate 42. A cylindrical skirt 44 depends from the outer periphery of the top plate to shield the frame 40 of the carrier.

Figure 3:
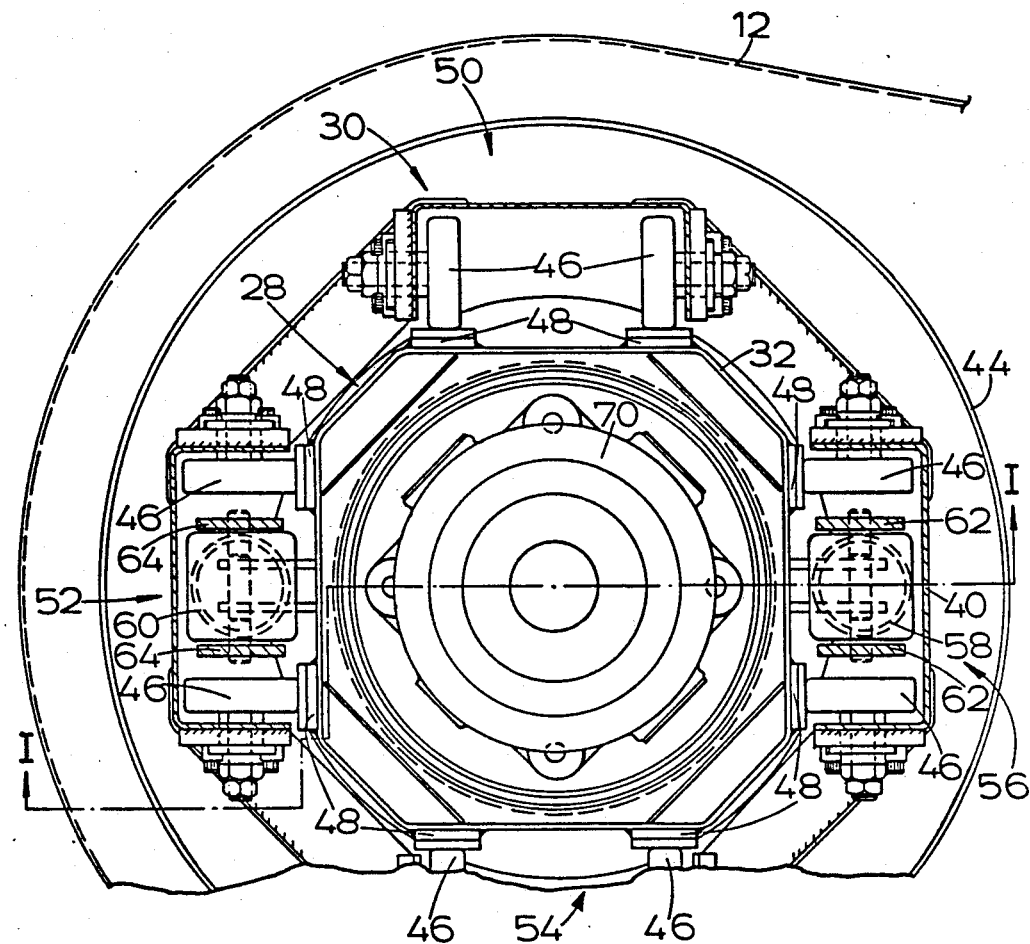
FIG. 3 is a partial plan view in section on the line III—III of FIG. 2.

The carriage 28 is guided for vertical movements within the carrier 30 by means of sixteen rollers 46 mounted on the carrier frame 40 and arranged to roll against linear tracks 48 secured to outer surfaces of the carriage frame 32. There are four sets 50, 52, 54, 56 of four rollers, each set extending longitudinally of the carriage and the sets being arranged in two pairs of opposed sets, the line of action of one pair of sets 50 and 54 being perpendicular to the line of action of the other pair of sets 52 and 56. Each set comprises an upper and a lower pair of rollers, the two pairs being spaced apart longitudinally of the carriage and the rollers in each pair of rollers being spaced apart transversely of the carriage. As shown in FIG. 3, the rollers 46 of each pair of rollers are pivotally mounted on the side walls of a radially-inwardly facing channel-shaped portion of the carrier frame 40, the two rollers being positioned between the side walls.

The carriage 28 is suspended from the carrier 30 by means of two pneumatic balancer cylinders 58 and 60 which act between the carrier and the carriage to take the weight of the carriage and its load. Supplies of air under pressure to the cylinders are regulated by suitable means to maintain the pressure within the cylinders constant as the carriage moves. The cylinders extend vertically, on opposite sides of the carriage axis, between top brackets 62 and 64 secured to the top plate 42 of the carrier and bottom brackets 66 and 68 secured to the carriage frame 32 adjacent its bottom end. The cylinders 58 and 60 are arranged equi-distant from, and on opposite sides of, the carriage/carrier axis, which it will be understood is also the first pivot axis 14, each cylinder extending from the top plate 42 down between the upper rollers and between the lower rollers of the two pairs of rollers of a roller set.

The apparatus 1 includes a nut-and-screw arrangement which determines the vertical position of the carriage 28 relative to the carrier 30, one of the nut and the screw being non-rotatably secured to one of the carriage and the carrier and the other of the nut and the screw being arranged to be rotated by vertical movement actuating means comprising a motor 70 mounted on the other side of the carriage and the carrier. The lite motor 70 is shown mounted on the carrier 30, being mounted in a well 72 of the carrier, and comprises an output shaft 74 arranged for rotation about the first pivot axis 14. By means of a coupling 76, a screw 78 is secured to the shaft 74, the screw being in threaded engagement with a recirculating ball nut 80 mounted on the cross-plate 34 of the carriage. An encoder and tachometer unit 82 and a brake unit 84 are associated with the motor 70.

Figure 2:
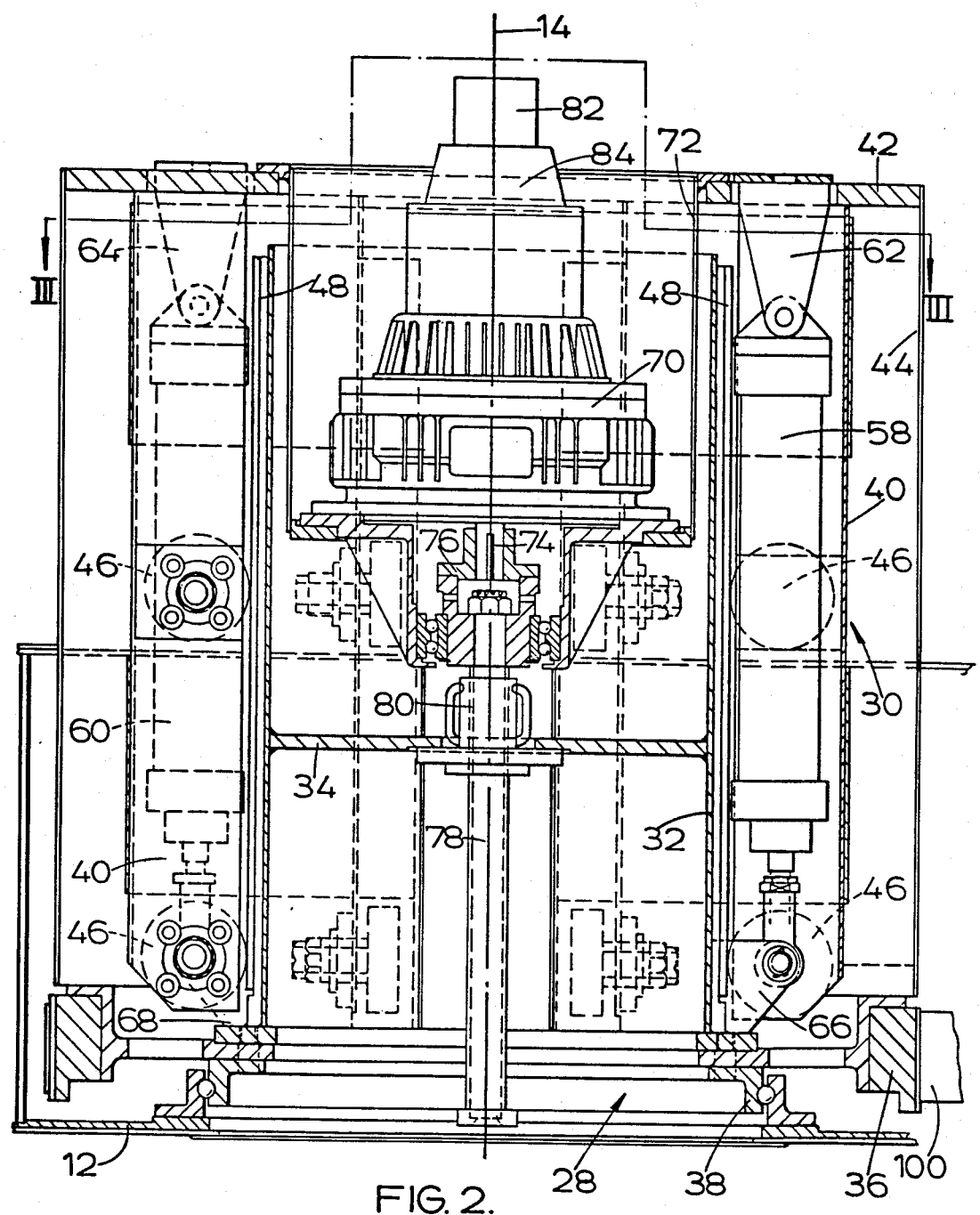
FIG. 2 is a partial view similar to FIG. 1 which shows the mounting means of the apparatus to a larger scale.

The crank arm 12 is affixed (as by bolts, not shown) to the outer race of the first turntable bearing 38 beneath the carriage frame 32 (FIG. 2). The arm 12 is of a hollow, tubular, fabricated, sheet metal construction. Adjacent an outer end of the crank arm 12, the crank lever 16 is pivotally mounted for rotation beneath the crank arm 12 about the second pivot axis 18. The lever 16 is mounted on arm 12 by means of a second slewing or turntable bearing 86 of the apparatus. An outer race of the bearing 86 is affixed as by bolts (not shown) to the crank arm 12 and the inner race is affixed to the crank lever 16.

Actuating means for horizontal movement is coupled to the crank lever 16 to rotate it about the second pivot axis 18 on the second turntable bearing 86 and comprises a second motor 88 of the apparatus. The motor 88 is mounted on the crank arm 12 (housed within the arm) in association with a gear reducer 89 secured fast to the arm 12. It has a vertical output shaft 90 arranged for rotation about the second pivot axis 18. The crank lever 16 is of a hollow, tubular, fabricated sheet steel construction. The gear reducer 89 and the output shaft 90 project from the crank arm into the interior of the crank lever. The shaft 90 is secured to the lever 16 by means of a sleeve 92 affixed as by welding to a bottom inside face of the lever 16. An encoder and tachometer unit 94 and a brake unit 96 are associated with the motor 88 to provide for accurate control of angular positions of the two arms and therefore of the linear position of the work support 20.

The first coordinating means, comprising the first geared connection 24, includes in addition to the pulley 36 of the carriage 28 a second pulley 98. The second pulley 98 coaxial with axis 18 is secured fast as part of the crank lever 16, and projects upwardly into space within the crank arm 12. The geared connection 24 comprises a toothed timing-belt 100 which extends around the two toothed pulleys 36 and 98 and through the crank arm 12 therebetween. The pulleys are sized to provide a geared connection in the ratio of 2:1 from the carriage 28 to the crank lever 16.

Adjacent an outer end of the crank lever 16, the work-supporting means 20 is pivotally mounted on the crank lever 16 for rotation about the third pivot axis 22. The work-supporting means comprises a third pulley 102 of the machine, affixed as by bolts (not shown) to an inner race of a third slewing or turntable bearing 104. An outer race of the bearing 104 is secured fast to a top inside face of the hollow crank lever 16, so that the pulley is housed substantially wholly within the crank lever. Adjustable attachment-holding means 106 for connection to a suitable specific workpiece pick-up device (not shown) is secured fast with the pulley 102 to depend beneath the crank lever 16.

The second coordinating means, comprising the second geared connection 26, includes in addition to the pulley 102 of the work-supporting means 20 a fourth pulley 108 of the apparatus 1. The fourth pulley 108 is secured fast as part of the crank arm 12, being secured generally beneath the motor 88, coaxially with the second pivot axis 18, and projecting downwardly into the interior of the crank lever 16. The second geared connection 26 comprises a toothed timing-belt 110 which extends around the two toothed pulley 108 and 102 and through the crank lever 16 therebetween. The pulleys 108 and 102 and the timing belt provide a geared connection in the ratio of 1:2 from the crank arm 12 to the work-supporting means 20.

Preferably, idlers 112 for each reach of each belt 110 and 100 are used to apply balanced pressure to opposite sides of the respective belts and take-up slack in each.

In operation of the apparatus 1, power for horizontal movement is supplied by motor 88. The motor 88, by way of reducer 89, is secured to crank arm 12 to move with it. The rotary output shaft of the motor is secured to crank lever 16 to move with it. Thus, when the motor 88 is energized, the arm 12 and lever 16 move angularly relative to each other about axis 18. The amount of such relative movement equals the degree of rotation of the output shaft 90. If the shaft rotates 90°, for example, the included angle between the two arms changes by 90°.

When the motor 88 is energized, there is also pivotal movement of the crank arm 12 about the axis 14. This occurs because pulley 98 is rotated about axis 18 with arm 16. The amount of the movement is determined by the 1:2 ratio of diameters of pulley 98 to pulley 36. Pulley 36 is stationary so motion of belt 100 by pulley 98 cannot move it. Instead, the entire arm 12 will pivot about axis 14 and the degree of angular movement will be one half the degree of rotation of shaft 90. If the shaft 90 rotates 90°, for example, the arm 12 will pivot 45° about axis 14.

Considering the apparatus 1 in the condition of FIG. 1, all three axes 14, 18, and 22 lie in the same vertical plane. If shaft 90 is rotated, axis 18 will be moved out of this vertical plane. Axis 14 is fixed in the vertical plane and does not move. Axis 22 stays in the vertical plane but moves to the left, i.e., it is retracted from its fully extended stroke position of FIG. 1. It stays in the same vertical plane because (a) axis 18 is always midway between axes 14 and 22 since the distance 14-18 equals the distance 18-22 and (b) and the 1:2 ratio of pulleys 98 and 36 insures that the angle of displacement of axis 18 out of the vertical plane (i.e. the angle made by arm 12 between its position in FIG. 1 and its displaced position) is one half that of the included angle between arm 12 and lever 16. If distance 14-18 is unequal to distance 18-22 (especially if the inequality is small), the difference in distance can be counteracted by corresponding change in the ratio of the diameters of pulleys 98 and 36 in order to maintain movement of axis 22 in the same vertical plane, i.e., straight line, horizontal motion. Alternatively, if a variation from straight line motion is desired, it can, within limits, be accomplished by variations in the distances 14-18 and 18-22 accompanied by appropriate sizing of pulleys 98 and 36. The isosceles relationship in which 14-18 substantially equals 18-22 is ordinarily preferable because it gives the maximum straight line stroke (i.e. four times the distance 14-18 or 18-22) and involves simpler relationships of lengths and pulley diameters.

Orientation of the work attachment 106 about the axis 22 is controlled by the coordinating means 26. With the 1:2 ratio between pulleys 108 and 102 that has been described, rotation of the work attachment 106 will be equal to angular movement by arm 12 about the axis 14 so that it remains straight even though it is moved horizontally. Alternatively, different orientations can be automatically achieved by varying the pulley ratios; or, even further, the coordinating means 26 can be eliminated and the work attachment 106 simply allowed to rotate freely and manually on bearing 104, or not at all by eliminating the bearing.

In conjunction with horizontal motion, or separately, vertical movement of the work-holding attachment 106 can be achieved by appropriately energizing lite motor 70. While this motor has been illustrated in alignment with axis 14, it and the vertical movement-actuating and support mechanism could be located elsewhere; for example, at axis 18. Similarly, while the rotary, horizontal drive motor is shown on axis 18, it could also be located elsewhere, on axis 14, for example, since the two coordinating systems 24 and 26 will maintain the desired relationship among the various parts.

While toothed pulleys and timing belts are presently preferred for the geared connections 24 and 26, in other embodiments other suitable forms of geared connection (e.g. using chains, V belts, wire ropes or gear trains) could be used. Similarly, instead of electric motors 70 and 88 hydraulic or fluid motors may be used depending upon the application, etc.

For use as production equipment, operation of the two motors 70 and 88 can be controlled and coordinated by any suitable control system and may be programmed by use of a computerised numerical control system to secure a desired sequence or combination of horizontal and vertical movements and a desired automatically repeatable path of movement of the work-holding attachment 106. Work-holding attachments such as jaws as shown in U.S. Pat. No. 3,975,992, for example, or controllable magnets or vacuum cups, etc., can therefore be secured to the attachment holding means 106 and operated in harmony with the apparatus 1 to pick-up, move, load and/or unload, and release workpieces (not shown) with respect to industrial presses, conveyors, etc.

Thus, the invention provides a heavy duty workpiece handling device which by virtue of the large turntable bearings (especially bearing 38) and other features described above eliminates the need for a guide track (such as used in British Pat. No. 1,395,085) and uses articulated and controlled cantilever action to impart a desired motion to a workpiece.

Modifications in the specific structure shown can be made without departing from the spirit and scope of the invention.

I claim:

1. Heavy duty workpiece handling apparatus for loading and unloading an industrial press or the like comprising a carrier adapted to be mounted on a support surface for the apparatus, a tubular carriage having a longitudinal axis, carriage support means supporting said carriage on the carrier so that said longitudinal axis is vertical and so that said carriage is linearly reciprocable along said vertical longitudinal axis but is constrained against angular movement around said axis and so that substantially all load on the carriage is transmitted into the carrier, power operated means for linearly reciprocating said carriage along said vertical longitudinal axis, said axis defining a first pivot axis, a first horizontally extending cantilever arm, first means pivotally supporting said first arm on said carriage to pivot in a horizontal plane about said first axis and to transfer substantially all load on the first arm into said carriage, a second horizontally extending cantilever arm, second means pivotally supporting said second arm on the end of the first arm to pivot in a horizontal plane about a second vertical pivot axis and to transfer substantially all load on the second arm into the first arm, work-supporting means adjacent the end of the second arm, third means pivotally supporting said work-supporting means on the end of the second arm to pivot in a horizontal plane about a third vertical pivot axis and to transfer substantially all load on it into the second arm said first and third pivot axes being located predetermined fixed distances from said second axis, movement coordinating means supported on and movable with said arms and arranged to so coordinate movement about said pivot axes that said work-supporting means moves in a predetermined horizontal path and with a predetermined angular orientation about said third axis, said coordinating means comprising belt means extending along said arms and pulleys for said belt means disposed about each of said three axes, the pulley around the first pivot axis being affixed to said non-pivotal tubular carriage whereby movement of said belt means causes said first arm to pivot around said first axis, and power operated means coupled to said coordinating means to rotate said arms and work-supporting means relative to each other whereby said work-supporting means moves along said predetermined path.

2. Apparatus as set forth in claim 1 wherein said carriage support means includes balancer cylinder means.

3. Apparatus as set forth in claim 2 wherein said carriage support means acts to suspend said tubular carriage and said balancer cylinder means acts between the carrier and carriage to take the weight of the carriage and the load on the carriage.

4. Apparatus as set forth in claim 1 wherein said carriage support means includes roller means between the carrier and tubular carriage to guide its movement along said first axis and to provide means to fix the angular position of the carriage relative to the carrier, said roller means being arranged in axially separated opposed sets of rollers on opposite sides of said vertical axis.

5. Heavy duty workpiece handling apparatus for loading and/or unloading a press or the like comprising mounting means for overhead mounting of the apparatus and having a substantially vertical axis comprising a first pivot axis, said mounting means including a non-pivotal tubular carriage and a large diameter annular turntable bearing means having inner and outer races and the inner one of said races being secured to the bottom end of said tubular carriage, said tubular carriage and bearing means being coaxial with said vertical first pivot axis, said bearing means receiving substantially the entire load handled by said apparatus, a first cantilever arm secured to the outer of said races such that said carriage and mounting means are positioned inside said first arm whereby it is pivotally mounted around said tubular carriage for angular movement in a horizontal plane about said first pivot axis, a second cantilever arm pivotally mounted on the bottom of said first arm for angular movement in horizontal plane about a second pivot axis substantially parallel to said first pivot axis and being movable below the first arm, and work-supporting means adjacent the end of said second arm and aligned with a third axis substantially parallel to said first and second pivot axes, said first and third axes being predetermined fixed distances from said second axis, said apparatus including coordinating means comprising structure supported on and movable with at least one of said arms and arranged to so coordinate movements of the arms about the first and second axes that said work-supporting means moves in a predetermined horizontal path below the level of the carriage and first arm and mounting means perpendicular to said axes, and power operated actuating means supported on at least one of said arms and coupled to said coordinating means to rotate said arms relative to each other about said second pivot axis and to pivot said first arm on said turntable bearing means whereby said work-supporting means moves along said predetermined path, said mounting means including a carrier telescopically arranged with said carriage within said carrier, carriage support means supporting said carriage on the carrier so that the longitudinal axis of the carriage is vertical and so that carriage is linearly reciprocable along said first vertical axis but is constrained against angular movement around said axis and so that substantially all load on the carriage is transmitted into the carrier, and power operated means for linearly reciprocating said carriage along said vertical longitudinal axis.

6. Heavy duty workpiece handling apparatus for loading and/or unloading a press or the like comprising a carrier adapted to be mounted on an overhead support surface for the apparatus, a vertically extending non-pivotal tubular carriage having a longitudinal axis and a relatively large diameter first turntable bearing means having inner and outer annular races and the inner of said races being secured to the bottom end of said tubular carriage, said tubular carriage and said turntable bearing means being coaxial and said axis being vertical and defining a first axis, carriage support means supporting said carriage on the carrier so that said longitudinal axis is vertical and so that carriage is linearly reciprocable along said vertical longitudinal axis but is constrained against angular movement around said axis and so that substantially all load on the carriage is transmitted into the carrier, power operated means for linearly reciprocating said carriage along said vertical longitudinal axis, a first horizontally extending cantilever arm secured at one end to the outer race such that said carriage and carrier are located inside said first arm whereby it is supported and pivotally mounted to said carriage for pivotal movement in a horizontal plane about said first vertical axis, a second horizontally extending cantilever arm located on a horizontal level beneath the first arm, a second cantilever arm support means supporting one end of the second arm on the other end of the first arm and beneath the first arm for pivotal movement in a horizontal plane about a second vertical axis substantially parallel to the first vertical axis and for transmitting load on the second arm into the first arm, work-supporting means, a support means supporting said work-supporting means on the other end of said second arm for pivotal movement about a third vertical axis substantially parallel to said first and second pivotal axes and for transmitting load on said work-supporting means into said second arm, said first and third pivot axes being located predetermined fixed distances from said second pivot axis, said apparatus including first coordinating means comprising a first geared connection supported within said first arm and arranged to so synchronously coordinate movements of the first and second arms about the first and second vertical pivot axes that said work-supporting means moves in a predetermined path below the level of the first arm and the carriage and the carrier, and second coordinating means comprising a second geared connection for synchronously coordinating movement of said work-supporting means relative to said first arm whereby the pivotal orientation of said work-supporting means about said third axis is predetermined throughout said path, and power operated arm actuating means supported on at least one of said arms for pivoting said arms about said first and second vertical axes, substantially all the load on said work-supporting means being transmitted by said support means into said second arm and substantially all the load on said first arm being transmitted by it into said first turntable bearing means and by said means into said vertically extending tubular carriage.

7. Apparatus according to claim 6 wherein said second cantilever arm support means comprises a relatively large diameter second turntable bearing means having first and second annular races substantially coaxial with said second axis, the first race of said second turntable bearing means being secured to the other end of the first arm and the second race thereof being secured to the one end of the second cantilever arm.

8. Apparatus according to claim 7 wherein said support means for the work-supporting means comprises a third turntable bearing means having first and second annular races substantially coaxial with and defining said third pivot axis, the first race of the third turntable bearing means being secured to the other end of the second arm and the second race being secured to said work-supporting means.

9. Apparatus according to claim 6 wherein said power operated arm actuating means is mounted on said first arm, means coupling said actuating means to said second arm to rotate said second arm about said second pivot axis whereby said first coordinating means causes rotation of said first arm about said first axis and consequent horizontal linear movement of said work-supporting means.

10. Heavy duty workpiece handling apparatus for loading and/or unloading a press or the like comprising mounting means for supporting the apparatus on a support surface, said mounting means including a vertically extending non-pivotal tubular carriage and a relatively large diameter first turntable bearing means having first and second annular races and the first of said races being secured to said tubular carriage, said tubular carriage and said turntable bearing means being coaxial and said axis being vertical and defining a first axis, a first horizontally extending cantilever arm secured at one end to the second race whereby it is supported and pivotally mounted on said mounting means for pivotal movement in a horizontal plane about said first vertical axis, a second horizontally extending cantilever arm located on a horizontal level beneath the first arm, a second cantilever arm support means supporting one end of the second arm on the other end of the first arm and beneath the first arm for pivotal movement in a horizontal plane about a second vertical axis substantially parallel to the first vertical axis and for transmitting load on the second arm into the first arm, work-supporting means, a support means supporting said work-supporting means on the other end of said second arm for pivotal movement about a third vertical axis substantially parallel to said first and second pivotal axes and for transmitting load on said work-supporting means into said second arm, said first and third pivot axes being located substantially equal distances from said second pivot axis, said apparatus including first coordinating means arranged to so coordinate movements of the first and second arms about the first and second vertical axes that said work-supporting means moves in a substantially straight and horizontal path below the level of the first arm, and second coordinating means comprising a geared connection from said first arm to said work-supporting means whereby the pivotal orientation of said work-supporting means about said third axis is predetermined throughout said path, and power operated arm actuating means for pivoting said arms about said first and second vertical axes, substantially all the load on said work-supporting means being transmitted by said support means into said second arm and substantially all load on said second arm being transmitted by said second cantilever arm support means into said first arm, and substantially all the load on said first arm being transmitted by it into said first turntable bearing means and by said first turntable bearing means into said vertically extending tubular carriage, said mounting means including a carrier, said tubular carriage being supported by and vertically reciprocable relative to said carrier in a direction along first axis, said first turntable bearing means pivotally mounting and supporting said first arm on said carriage for vertical movement with the carriage, and power operated means for vertically moving said tubular carriage along said first axis, said carriage being suspended from said carrier by means comprising a plurality of turntable bearing means.

11. Apparatus according to claim 10 wherein said power operated means comprises a nut-and-screw arrangement which determines the vertical position of said tubular carriage relative to said carrier, one of the nut and the screw being non-rotatably secured to one of the carriage and the carrier and the other of the nut and the screw being arranged to be rotated by a motor mounted on the other of the carriage and the carrier.

12. Apparatus according to claim 6 in which said carriage and said carrier are telescopically arranged with the carriage within the carrier, said carriage and carrier having facing flat sides and including rollers mounted on one of said carriage and said carrier and arranged to roll against the flat faces of the carriage and serving to guide telescopic movement of the carriage.

13. Apparatus according to claim 12 in which said carriage is guided in its movement by four sets of said rollers, each set extending longitudinally of the carriage and the sets being arranged in two pairs of opposed sets, the lines of action of the two pairs of sets being perpendicular to one another.

14. Apparatus according to claim 13 in which each set, in at least one of the pairs of sets, comprises two pairs of rollers, the two pairs of rollers being spaced apart longitudinally of the carriage and the rollers in each pair of rollers being spaced apart transversely of the carriage, said rollers being located above the level of said first turntable bearing means.

15. Apparatus according to claim 6 in which said first and third pivot axes are located substantially equal distances from said second pivot axis, and said first coordinating means comprises a first geared connection in the ratio of substantially 2:1 from said tubular carriage to said second arm and said second coordinating means comprises a second geared connection in the ratio of substantially 1:2 from said first arm to said work-supporting means.

16. Apparatus according to claim 15 in which said first and second arms are hollow and said first geared connection extends through said first arm to said second arm, and said second geared connection extends through said second arm to said work-supporting means.

17. Apparatus according to claim 16 in which said first and second geared connections comprises timing belts extending through said arms and pulleys disposed about each of said three axes, said timing belts extending around said pulleys, the pulley around the first axis being secured at and around the lower end portion of said tubular carriage.

18. Apparatus according to claim 17 including idler means engaging said timing belts to take up slack therein.

19. Heavy duty workpiece handling apparatus for loading and/or unloading a press or the like comprising a carrier adapted to be mounted on an overhead support surface for the apparatus, a vertically downwardly extending non-pivotal tubular carriage having a longitudinal axis, a relatively large diameter turntable bearing means having inner and outer annular races and the inner of said races being secured to said tubular carriage at the bottom end of the carriage, said tubular carriage and said turntable bearing means being coaxial and said axis being vertical and defining a first axis, carriage support means supporting said carriage on the carrier so that longitudinal axis is vertical and so that said carriage is linearly reciprocable along said vertical longitudinal axis but is constrained against angular movement around said axis and so that substantially all load on the carriage is transmitted into the carrier, power operated means for linearly reciprocating said carriage along such vertical longitudinal axis, a first horizontally extending cantilever arm surrounding said carriage and carrier and secured at one end to the outer race whereby it is supported and pivotally mounted to said carriage for pivotal movement in a horizontal plane around the carrier and the carriage about said first vertical axis, a second horizontally extending cantilever arm located on a horizontal level beneath the first arm, a second cantilever arm support means supporting one end of the second arm on the other end of the first arm and beneath the first arm for pivotal movement in a horizontal plane about a second vertical axis substantially parallel to the first vertical axis and for transmitting load on the second arm into the first arm, work-supporting means, a support means supporting said work-supporting means on the other end of said second arm for transmitting load on said work-supporting means into said second arm, said apparatus including coordinating means arranged to so coordinate movements of the first and second arms about the first and second vertical pivot axes that said work-supporting means moves in a predetermined path below the level of the first arm and the carrier and carriage, and power operated arm actuating means coupled to said coordinating means and supported by at least one of said arms for pivoting said arms about said first and second vertical axes, substantially all the load on said work-supporting means being transmitted by said support means into said second arm and substantially all load on said second arm being transmitted by said second cantilever arm support means into said first arm, and substantially all the load on said first arm being transmitted by it into said first turntable bearing means and by said means into said vertically extending tubular carriage.

20. Apparatus according to claim 19 wherein said second cantilever arm support means comprises a relatively large diameter second turntable bearing means having first and second annular races substantially coaxial with said second axis, the first race of said second turntable bearing means being secured to the other end of the first arm and the second race thereof being secured to the one end of the second cantilever arm.

21. Heavy duty workpiece handling apparatus for loading and/or unloading a press or the like comprising a carrier adapted to be mounted on an overhead support surface for the apparatus, a vertically downwardly extending non-pivotal tubular carriage having a longitudinal axis, a relatively large diameter turntable bearing means having inner and outer annular races and the inner of said races being secured to said tubular carriage at the bottom end of the carriage, said tubular carriage and said turntable bearing means being coaxial and said axis being vertical and defining a first axis, carriage support means supporting said carriage on the carrier so that longitudinal axis is vertical and so that said carriage is linearly reciprocable along said vertical longitudinal axis but is constrained against angular movement around said axis and so that substantially all load on the carriage is transmitted into the carrier, power operated means for linearly reciprocating said carriage along such vertical longitudinal axis, a first horizontally extending cantilever arm secured at one end to the outer race whereby it is supported and pivotally mounted on said carriage for pivotal movement in a horizontal plane below the carrier and the carriage about said first vertical axis, a second horizontally extending cantilever arm located on a horizontal level beneath the first arm, a second cantilever arm support means supporting one end of the second arm on the other end of the first arm and beneath the first arm for pivotal movement in a horizontal plane about a second vertical axis substantially parallel to the first vertical axis and for transmitting load on the second arm into the first arm, work-supporting means, a support means supporting said work-supporting means on the other end of said second arm for transmitting load on said work-supporting means into said second arm, said apparatus including coordinating means arranged to so coordinate movements of the first and second arms about the first and second vertical pivot axes that said work-supporting means moves in a predetermined path below the level of the first arm and the carrier and carriage, and power operated arm actuating means for pivoting said arms about said first and second vertical axes, substantially all the load on said work-supporting means being transmitted by said support means into said second arm and substantially all load on said second arm being transmitted by said second cantilever arm support means into said first arm, and substantially all the load on said first arm being transmitted by it into said first turntable means and by said means into said vertically extending tubular carriage, said carriage being telescopically mounted inside said carrier, said carriage and carrier having facing flat side faces, and sets of rollers between the carriage and carrier and engaging said flat faces and serving to guide telescopic movement of the carriage along said first vertical axis, and a plurality of balancer cylinders located above said turntable bearing means connected to said carriage and to said carrier and suspending the carriage on the carrier and taking the weight of the carriage and its load and transferring it into the carrier, said sets of rollers and balancer cylinders comprising said carriage support means.

* * * * *